United States Patent [19]

Law

[11] 4,303,271
[45] Dec. 1, 1981

[54] MILITARY VEHICLE

[75] Inventor: William J. H. Law, Port Chester, N.Y.

[73] Assignee: AAL Enterprises, Inc., New York, N.Y.

[21] Appl. No.: 153,960

[22] Filed: May 28, 1980

[51] Int. Cl.³ .............................................. B60P 3/42
[52] U.S. Cl. ....................................... 296/10; 296/64
[58] Field of Search ..................... 296/10, 14, 63, 64, 296/61, 57 R; 414/537, 538

[56] References Cited

U.S. PATENT DOCUMENTS

| 1,410,193 | 3/1922 | Klemm | 296/14 |
| 2,704,989 | 3/1955 | Konecny | 296/64 |
| 3,392,798 | 7/1968 | Sipe | 296/64 |
| 4,188,060 | 2/1980 | Alcanzare | 296/63 |

Primary Examiner—Robert R. Song
Attorney, Agent, or Firm—Brooks, Haidt, Haffner & Delahunty

[57] ABSTRACT

This invention relates to military vehicles and in particular provides a vehicle that is convertible from a troop carrier for transporting and deploying ground troops to a cargo carrier.

2 Claims, 8 Drawing Figures

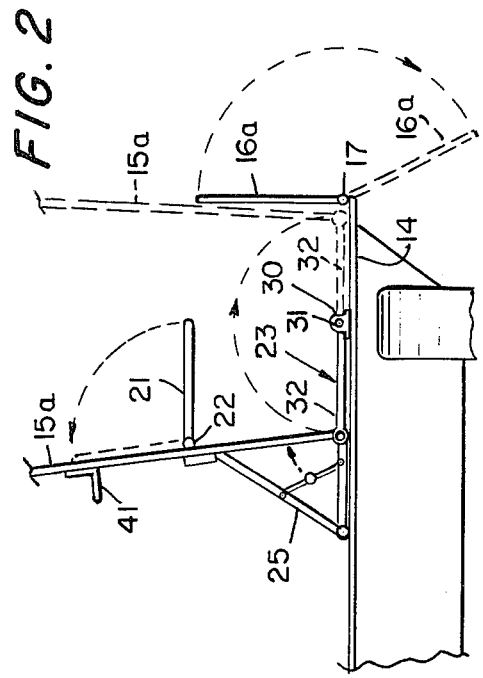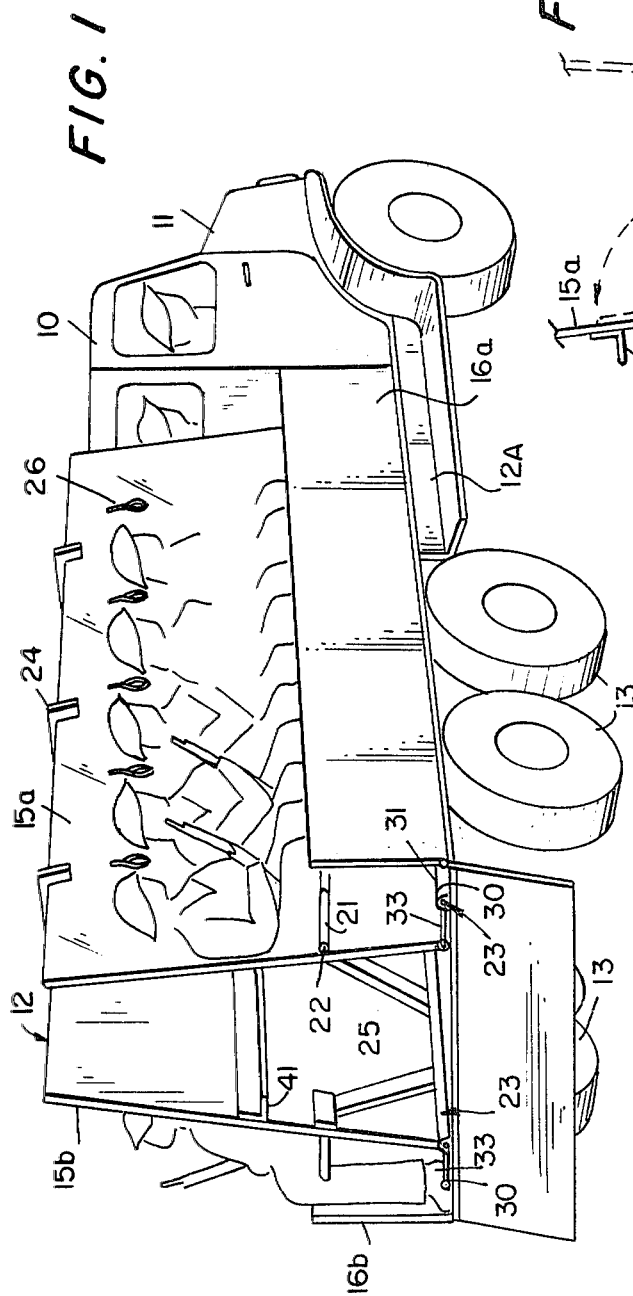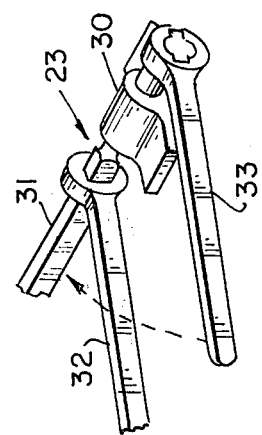

MILITARY VEHICLE

In Law pending applications Ser. No. 143,447, filed Apr. 24, 1980, and Ser. No. 149,635, filed May 14, 1980, a troop carrier of otherwise conventional construction is disclosed in which the troop carrying body portion located on the rear portion of the truck or other vehicle is provided with an elongated, approximately upright armored panel extending lengthwise of the troop carrier body portion and located inwardly of the sides of the body portion a sufficient distance to permit troops to be seated on the exteriorly exposed side of the panel. "Armored" in this context means armor plate or other bullet and shrapnel resistant material.

The carrier body portion is also provided with a side panel extending lengthwise of the body portion located on the exterior side of the armored panel and which is hinged along its lower edge such that it can be moved from a vertical position to a position swung outwardly away from the body portion providing clear access to the interior of the carrier body portion from the side of the vehicle to enable troops sitting in seats in front of the armored panel to exit simultaneously thus enabling rapid evacuation.

Preferably the vehicle is provided on both sides of the carrier portion with such an arrangement such that there is a space between the armored panels enabling storage of arms and other equipment or for the transporting of the wounded. Preferably the armored panel or panels are of a height sufficient to provide protection for the seated troops such that while exposed on the side which they are faced they are protected from the rear while being transported and while evacuating the carrier.

Such a vehicle is not generally useful as a cargo carrier because the armored panels obstruct access to the interior of the carrier body. It is thus an important object of this invention to provide such a troop carrier in which the carrier body can be readily and easily converted to a cargo carrier having open access to the interior, such that the vehicle can be used as a general cargo carrier when its use as a troop carrier is not required. It is also an object of this invention to provide such a carrier which can be reconverted to a troop carrier whenever and wherever required.

In accordance with this invention, therefore, provision is made to relocate the armored panels to provide clear access to the carrier interior. Preferably the armored panels are transferable to the side panels by a rotating transfer mechanism.

For a more complete understanding the practical application of this invention reference is made to the appended drawings in which:

FIG. 1 is a perspective view of a troop carrier in accordance with this convention;

FIG. 2 is a rear elevation of a portion of the carrier shown in FIG. 1 showing an armored panel transfer mechanism in accordance with this invention;

FIG. 3 is a fragmentary, perspective view of a portion of the transfer mechanism;

Figure 4:
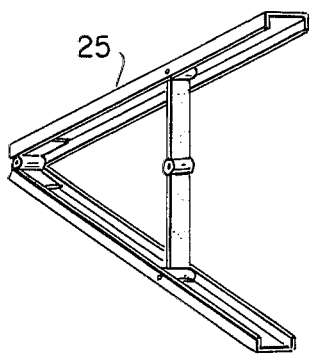
FIG. 4 is a perspective view of another portion of the invention.
Figure 5:
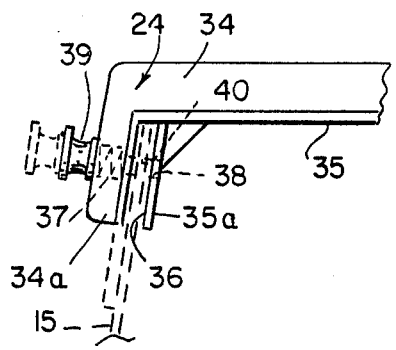
FIG. 5 is an end view of a clamp for securing armored panels in spaced relations.

Referring more particularly to FIG. 1 the reference numeral 10 designates a motorized troop carrier such as a 6×6 truck. Truck 10 is provided to the rear of its cab 11 with a carrier body 12 in accordance with this invention resting on a chassis 12A and extending over rear wheels 13.

Body portion 12 is provided with a floor 14 of conventional construction (see FIG. 2).

A pair of armor plate panels 15a and 15b are mounted in body portion 12 extending lengthwise of body portion 12 in approximately upright position resting on floor 14. Panel 15a is located on the right side of the vehicle spaced inwardly from the outer side of floor 14 a sufficient distance to permit seating of troops between panel 15a and the right side of vehicle 10. Panel 15b is similarly positioned on the left side of vehicle 10. Preferably panels 15a and 15b are canted inwardly at their upper ends and are held spaced apart at their upper edges by clamps 24 and at their lower edges by transfer mechanisms 23 such that they sit at an angle from the vertical to facilitate the seating of troops in front of panels 15a and 15b, to deflect shrapnel and bullets. Plate brackets 25 (See also FIG. 4) are used to aid in positioning panels 15a and 15b.

A transfer mechanism 23 is employed for each panel 15a and 15b and functions to retain the lower edge of such panel either at the position shown in solid lines in FIG. 2 when vehicle 10 is used as a troop carrier or at the position shown in dashed lines in FIG. 2 when vehicle 10 is used as a general cargo carrier. Each transfer mechanism 23 includes two or more aligned bearing blocks 30 mounted spaced along floor 14 rotatably receiving a shaft 31 extending lengthwise of body 12 spaced outwardly from the lower edge of the armored panel (solid line position).

A series of link rods 32 are fixed at one set of ends to shaft 31, such that rods 32 are aligned and spaced along shaft 31. Rods 32 are rotatably attached at their other set of ends to the lower edge of the associated armor panel 15a and 15b. A lever 33 (see FIG. 3) is secured to the end of each shaft 31 adjacent the rear end of floor 14.

Body portion 12 of vehicle 10 is further provided with side panels 16a and 16b running lengthwise of body portion 12, side panel 16a being on the outer side of floor 14 along the right side of the truck and side panel 16b being on the outer side of floor 14 on the left side of the truck. Panels 16a and 16b are approximately the same length as armor plate panels 15a and 15b, and are hingedly fastened at their lower edges, for example, to floor 14 as indicated in FIG. 2 by reference numeral 17. Each side panel 16a and 16b is retained normally in an upright position by a releasable latch mechanism (not shown) adjacent cab 11.

Figure 6:
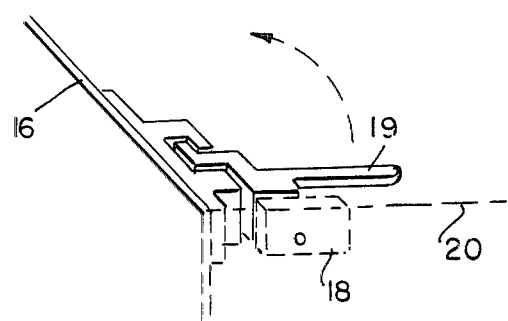
FIG. 6 is a fragmentary, perspective view of a latch mechanism to retain the side panels and a tail gate.

Preferably body portion 12 of vehicle 10 is provided with a rear end panel, such as a tailgate 20, which can be hinged to floor 14 and latched to armor panels 15a and 15b at their rear ends for retention in upright position. Side panels 16a and 16b can also be provided with a releasable latch mechanisms 18 (see FIG. 6) securing them to rear panel 20.

Figure 7:
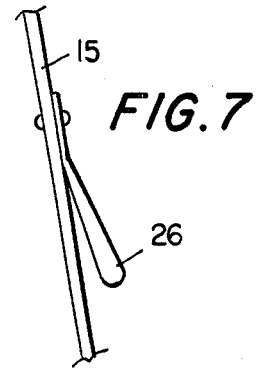
FIG. 7 is a fragmentary, vertical section of a hand strap on an armored panel to be used in rough terrain.

Seats are provided backing up against panels 15a and 15b on their exterior sides, that is, the sides facing side panels 16a and 16b respectively. As shown in FIG. 2 such seats can be in the form of boards 21 which are horizontally positioned at the appropriate height extending lengthwise along the exterior sides of panels 15a and 15b to which they can be hingedly attached, as indicated at 22. Latches (not shown) or removeable props (not shown) are required to retain the seats in horizontal position. Such latches or props can be disengaged to permit board 21 to be raised flat against the exterior surface of panels 15a and 15b in order to permit loading and unloading the compartment between panels 15a and 15b and their associated side panels 16a and 16b, respectively. Canvas straps 26 (see FIG. 7), one for each trooper are fastened to panels 15a and 15b.

Vehicle 10 is employed in transpotation and deployment of armed troops generally where rapid ground deployment is required. In the troop carrier arrangement, panels 15a and 15b are in the solid line position shown in FIG. 2 and are as shown in FIG. 1. Clamp mechanism 24, as indicated above, are used to retain the upper edges of panel 15a and 15b spaced apart.

Each clamp mechanism 24 is wooden beam 34 formed of oak or other suitable hard wood having a steel plate 35 attached to its underside. The ends 34a of each beam 34 are extended at a downward angle and plates 35 are bifurcated at their ends 35a to form slots 36 sized to receive an edge of an armored panel 15a and 15b. Apertures 37 in beam ends 34a are aligned with tapped apertures 38 in plate ends 35a which threadedly receive bolts 39 which span slots 36. Thus clamps 24 can be secured to the upper edges of panels 15a and 15b by placing holes 40 spaced along the upper edges of panels 15a and 15b positioned to receive bolts 39 when such upper edges are received in slots 36.

In loading vehicle 10 panels 16a and 16b are lowered, as shown in dashed lines in FIG. 2, to permit boarding by the troops. Seats 21 are placed in horizontal position such that the troops sit with their backs to armored panels 15a and 15b facing outwardly of the side of the vehicle. Side panels 16a and 16b are then raised and latched in position.

Figure 8:
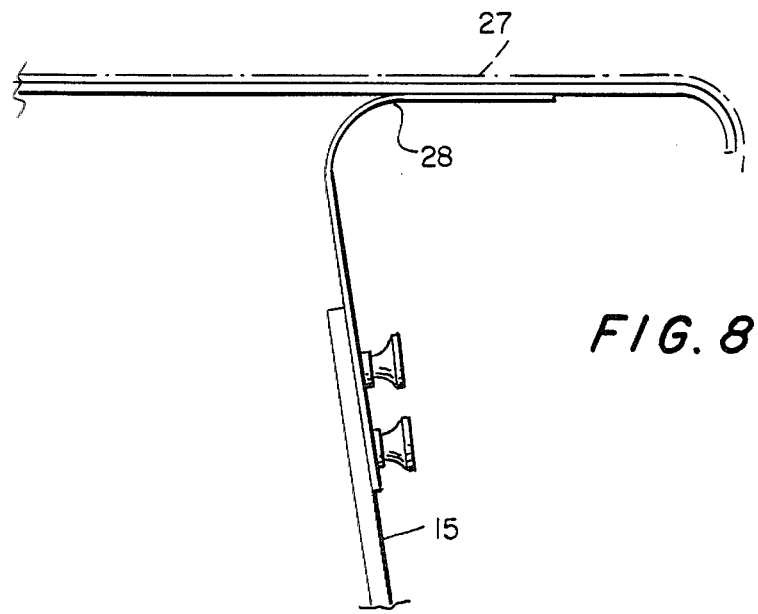
FIG. 8 is a fragmentary vertical section illustrating installation of a canvas top in adverse weather.

Supplies and other material can be stored in the space 22 located between panels 15a and 15b where such storage is required. To this end the interiorly facing sides of panels 15a and 15b are preferably provided with horizontal slides 41 confronting each other located such that their spacing is suitable to receive a stretcher rack for transportation while the vehicle is set up in the troop carrier mode.

Where the weather requires, canvas tops 27 can be mounted above the top edge of panels 15a and 15b by roof supports 28, as shown in FIG. 8.

When it is necessary to evacuate the vehicle, for example, in the event of surprise attack, releasing the latches for panels 16a and 16b permits them to drop out enabling complete leg clearance for simultaneous evacuation of all troops in the carrier body 12. At the same time where the attack is from one side of the vehicle the troops on the other side who can not see the attack are protected by the panels 15a and 15b while they evacuate the vehicle.

Vehicle 10 can be readily converted to a cargo carrying truck by shifting panels 15a and 15b by the use and rotation of transfer mechanisms 23. To carry out the conversion, seats 21 are raised to positions parallel with their associated armored panels 15a and 15b (dashed line position shown in FIG. 2.) Clamp mechanisms 24 are then loosened and removed. Plate brackets 25 are removed, if these were used, and levers 33 are rotated to relocate panels 15a and 15b. Thus, for example, the lever 33 associated with the shaft 31 on the right side of vehicle 10 is rotated clockwise one-half turn to flip the lower edge of panel 15a, as shown in dashed lines, to a position adjacent side panel 16a in which panel 15a can be rested against and attached to body side panel 16a. When both panels 15a and 15b are thus fastened to side panels 16a and 16b vehicle 10 converts to a high-sided, cargo carrying vehicle. Reconversion simply involves the reverse procedure.

I claim:

1. A vehicle having a carrier body adapted for cargo-carrying and to transporting personnel, which includes an armored panel extending lengthwise of said body in approximately upright position, a side panel on said body located along said one side of said body on an exterior side of said armored panel, said side panel being pivotly mounted along the lower edge thereof whereby said side panel can be lowered from an upright position in front of said armored panel outwardly of said body portion, means for relocating said armored panel between a first position inward of said side panel and a second position adjacent said side panel, and seating means positioned along the exterior side of said armored panel between said armored panel and said side panel.

2. A troop carrier vehicle having a body portion according to claim 1 which further comprises a second armored panel, side panel, relocating means and seating means according to claim 1 positioned along the other side of said body.

* * * * *